United States Patent

Corbett

[11] 3,853,373
[45] Dec. 10, 1974

[54] EASY-ENTER VEHICLE SEAT
[75] Inventor: Thomas J. Corbett, Sterling Heights, Mich.
[73] Assignee: General Motors Corporation, Detroit, Mich.
[22] Filed: Sept. 12, 1973
[21] Appl. No.: 396,390

[52] U.S. Cl. .............................. 297/341, 248/429
[51] Int. Cl. ............................................. B60n 1/04
[58] Field of Search ............ 297/341, 379; 248/424, 248/429

[56] References Cited
UNITED STATES PATENTS

| | | | |
|---|---|---|---|
| 2,576,365 | 11/1951 | Scott et al. | 248/424 |
| 2,795,265 | 6/1957 | Albrecht | 297/341 |
| 2,820,506 | 1/1958 | Duluk et al. | 297/341 |
| 3,695,695 | 10/1972 | Colucci | 297/341 |

Primary Examiner—Francis K. Zugel
Attorney, Agent, or Firm—Herbert Furman

[57] ABSTRACT

A vehicle seat including a seat cushion and a seat back is conventionally mounted on the vehicle floor by a track assembly which permits fore and aft adjustment of the seat. The seat back includes inboard and outboard support arms which are respectively mounted to the frame of the seat cushion by pivots to permit forward tilting movement of a seat back to an easy-enter position. A first link is pivotally mounted on one of the pivots of the seat back and has its other end pivoted to a second link which is in turn pivoted to a stationary member. A latch acting between the seat back and the first link can be unlatched to permit fore and aft adjusting movement of the vehicle seat and consequent rotation of the first link about the pivot while the seat back remains in its normal position. When the seat back is tilted forwardly, the latch causes the first link to be rotated with the seat back causing the entire vehicle seat to be pulled forwardly on the track assembly by virtue of the connection of the other end of the first link to the stationary member by the second link.

3 Claims, 8 Drawing Figures

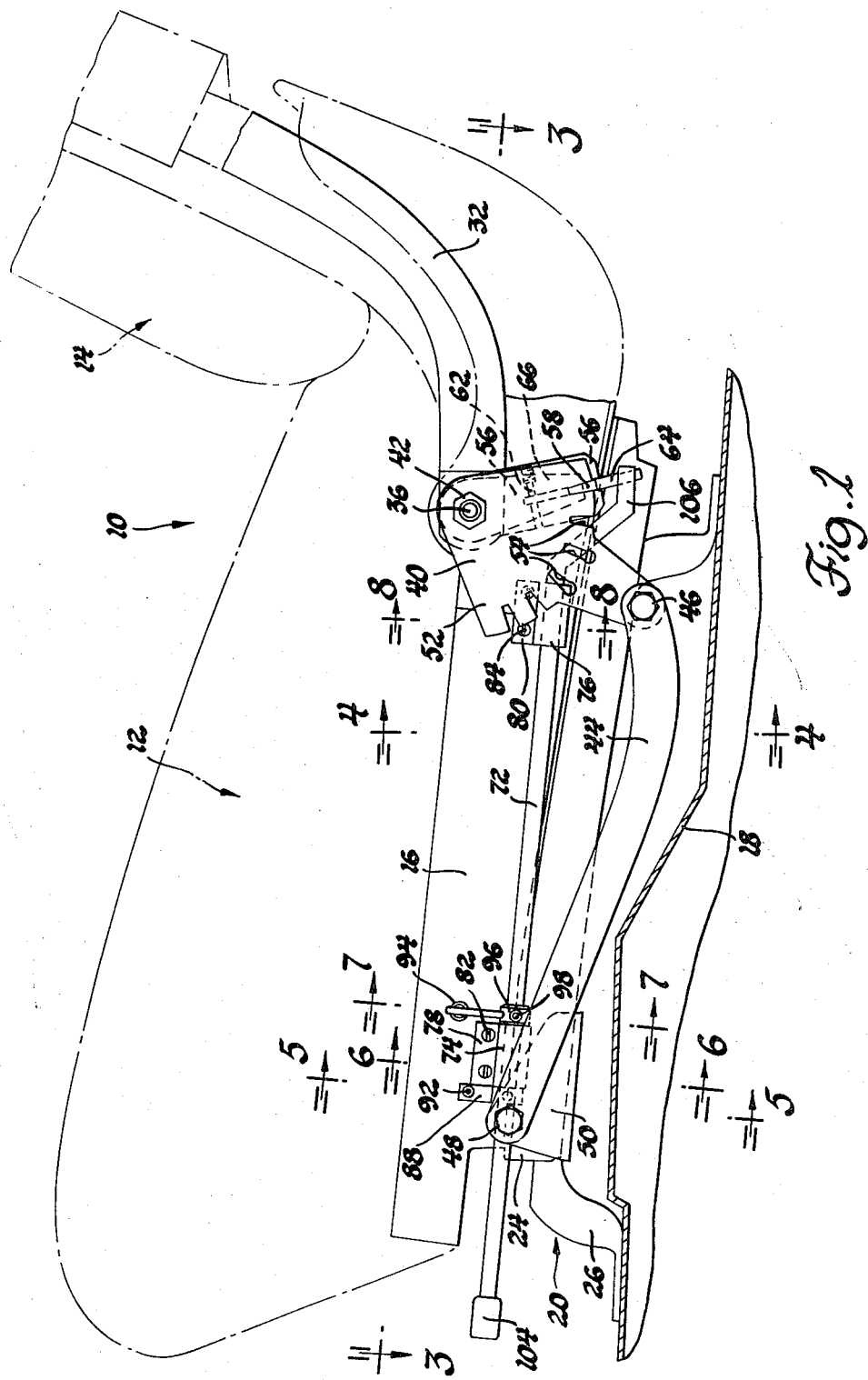

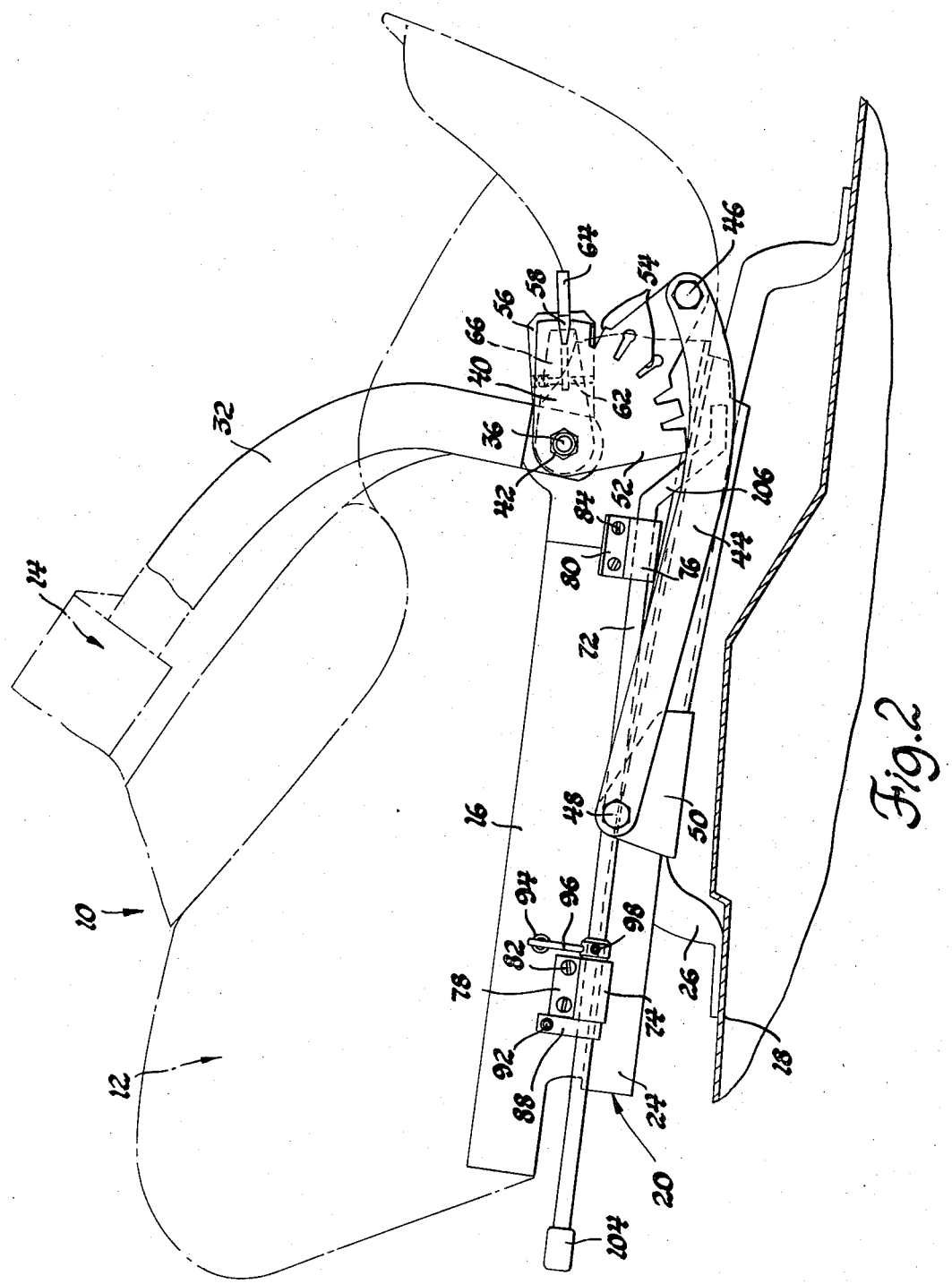

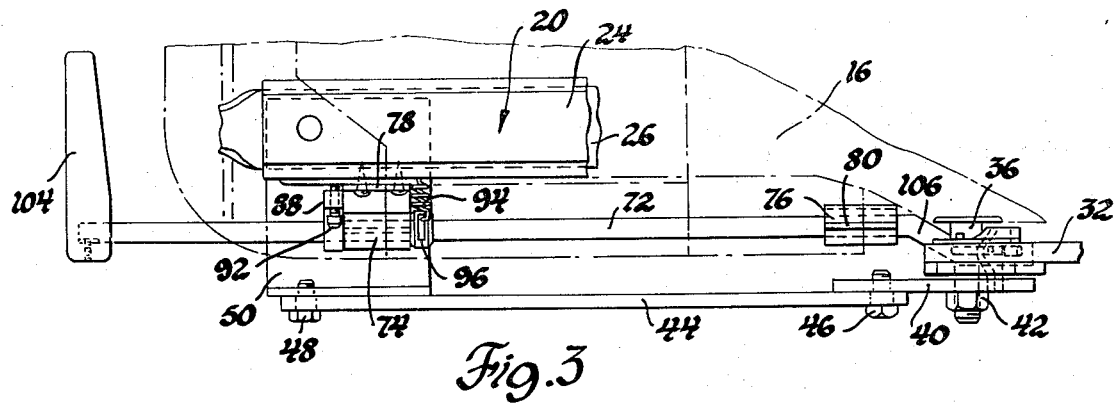
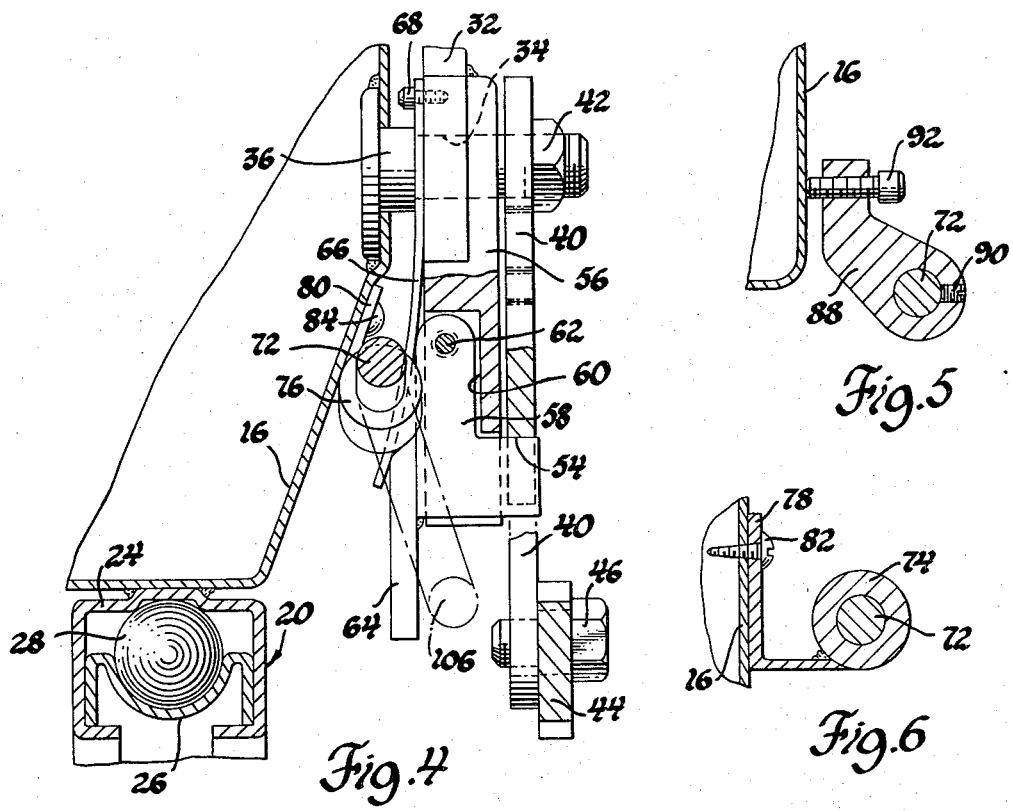
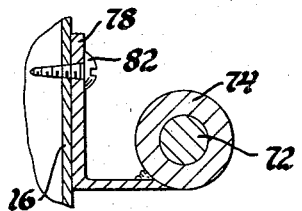
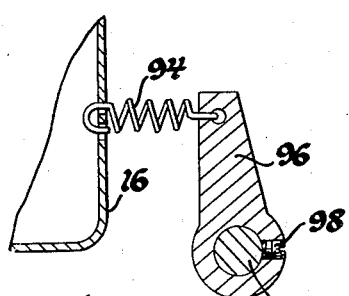
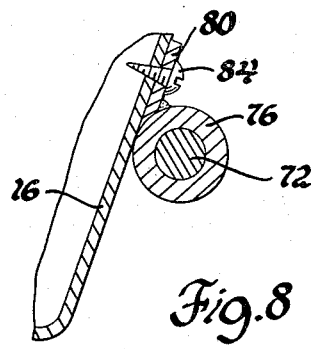

EASY-ENTER VEHICLE SEAT

The invention relates to a vehicle seat which is shifted bodily forwardly on a seat adjuster track when the seat back is tilted forwardly.

It is known to mount vehicle seats on a horizontal track which permits fore and aft adjustment of the seat to suit the particular driver.

It is also known to pivot the seat back to the seat cushion to permit forward tilting of the seat back to facilitate entering and leaving the rear seat of a two-door vehicle.

It is also known to provide a seat construction in which forward tilting movement of the seat back automatically causes forward bodily movement of the vehicle seat on the horizontal adjuster track to provide an increased access opening to the rear seat.

The present invention provides an improved and simplified apparatus for connecting the seat back and seat cushion to attain the aforedescribed desirable features.

According to the present invention, a vehicle seat is provided including a seat cushion and a seat back. The seat cushion is conventionally mounted on the vehicle floor by a track assembly which permits fore and aft adjustment of the seat. The seat back includes laterally spaced inboard and outboard support arms which are mounted to the frame of the seat cushion by pivots to permit forward tilting movement of the seat back from the normal seating position to an easy-enter position facilitating access to the rear seat of the vehicle. A first link is pivotally mounted on the pivot of one of the support arms and has its other end pivoted to a second link. The other end of the second link is in turn pivoted to a stationary member such as the vehicle floor or the stationary track of the track assembly. Thus when the vehicle seat is adjusted fore and aft on the track assembly the first link is rotated about the pivot means.

A latch arrangement is provided between the support arm and the first link and includes a sector or arcuate segment on the first link having a plurality of spaced notches. The support arm has an extension which is disposed adjacent the sector of the first link. A latch member is pivotally mounted on the extension of the support arm and is spring biased into an adjacent notch of the sector to latch the support arm to the first link. Thus when the seat back is moved forwardly to easy-enter position the first link is rotated and vehicle seat pulled forwardly on the track assembly by virtue of the connection of the other end of the first link to the stationary member by the second link.

An operating handle is provided to move the latch member against the bias of the spring and out of engagement with the notch of the sector. The vehicle seat may then be adjusted fore and aft while the seat back remains in the seating position. The spring returns the latch member into engagement with the aligned notch of the first link.

Thus the invention provides an easy-enter seat construction which facilitates ingress and egress to the rear seat by bodily forward shifting movement of the entire vehicle seat as well as forward tilting movement of the seat back.

In the drawings:

FIG. 1 is a side elevational view of a vehicle seat according to the invention and adjusted fully rearwardly and in normal seat defining position;

FIG. 2 is a view similar to FIG. 1 showing the seat back tilted forward to easy-enter position;

FIG. 3 is a partial sectional view taken in the directions of arrows 3—3 of FIG. 1;

FIG. 4 is a partial sectional view taken in the direction of arrows 4—4 of FIG. 1;

FIG. 5 is a partial sectional view taken in the direction of arrows 5—5 of FIG. 1;

FIG. 6 is a partial sectional view taken in the direction of arrows 6—6 of FIG. 1;

FIG. 7 is a partial sectional view taken in the direction of arrows 7—7 of FIG. 1; and FIG. 8 is a partial sectional view taken in the direction of arrows 8—8 of FIG. 1.

Referring to FIG. 1 a vehicle seat structure according to the invention is shown. A vehicle seat indicated generally at 10 includes a seat cushion assembly 12 and a seat back assembly 14. The seat cushion assembly 12 includes a frame 16 which is mounted on the vehicle floor 18 by a track assembly 20.

The track assembly 20, as best seen in FIG. 4, includes an upper track 24 attached to the frame 16 and a lower track 26 conventionally attached to the vehicle floor. A plurality of balls 28 are seated between the upper track 24 and the lower track 26. The track assembly 20 permits fore and aft adjusting movement of the vehicle seat 10.

The seat back assembly 14 includes an outboard J-shaped support arm 32 and a like inboard J-shaped support, not shown. As seen in FIG. 4, the support arm 32 has at its lower end an aperture 34 by which it is pivotally mounted on a pivot pin 36 attached to the frame 16 of the seat cushion assembly 12. The inboard support arm is similarly pivotally attached to the frame 16 so that the seat back assembly 14 may be tilted forwardly about the pivot pins 36 to an easy-enter position as seen in FIG. 2 which provides ease of ingress and egress with respect to the rear seat. The vehicle seat may be equipped with a conventional seat back latch, not shown, which acts between the seat back assembly 14 and the frame 16 of the seat cushion assembly 12 to normally lock the seat back from such forward tilting movement until the latch is unlatched.

A latch is also provided for the seat adjusting mechanism. Referring to FIGS. 1 and 4, a link 40 has its one end pivotally mounted on the pivot pin 36 of seat cushion frame 16 and is retained thereon by a nut 42 engaged on the pivot pin 36. The other end of the link 40 is pivotally attached to a link 44 by a shoulder bolt 46. The other end of link 44 is pivotally attached by a shoulder bolt 48 to a bracket 50 which is attached to the lower track 26 or may alternatively be attached to the vehicle floor 18 or any stationary member. It will be apparent that as the vehicle seat 10 is moved fore and aft on the track assembly 20 the link 40 will be bodily shifted and rotate about the pivot pin 36 and shoulder bolt 46. The link 40 has a plurality of spaced openings or notches 54 in a sector portion 52 thereof which is arcuate about the pivot pin 36. As best seen in FIG. 4, the outboard support arm 32 of the seat back assembly 14 has a bar 56 attached thereto by welding and extending generally downwardly toward the floor 18. A generally L-shaped latch lever 58 is received in a slot or recess 60 of the bar 56 and is pivotally mounted thereon by a shaft 62. The latch lever 58 has an attached bar 64 providing a downwardly extending extension. A leaf spring 66 is attached to the support arm 32 by a screw 68 and engages the bar 64 to urge the latch lever 58 to its latched position, FIG. 4, wherein the latch lever extends into one of the notches 54 of link 40.

An operating mechanism is provided to latch and unlatch the latching lever 58 from the notch 54. The operating mechanism includes a shaft 72 which runs along side the seat 10 and is attached to the frame 16 by sleeves 74 and 76. As seen in FIGS. 6 and 8 the sleeves 74 and 76 are attached to the frame 16 by their respective brackets 78 and 80 and screws 82 and 84. Referring to FIG. 5 a stop is provided to determine the normal rotational position of the shaft 72. An arm 88 is attached to the shaft 72 by a set screw 90. A screw 92 is received in the end of arm 88 and may be screwed in and out to adjust the normal rotational position of shaft 72. Referring to FIG. 7, a spring 94 acts between frame 16 and an arm 96 attached to the shaft 72 by a set screw 98 to urge the shaft 72 to its normal rotational position wherein the screw 92 engages the frame 16. As best seen in FIG. 3, the spring arm 96 and the stop arm 88 are located adjacent and on opposite sides of the sleeve 74 so that the longitudinal position of the shaft 72 is fixed relative the seat frame 16. An operating handle 104 is attached to the forward end of the shaft 72.

When the seat occupant lifts the end of operating handle 104, the downturned end 106 of rod 72 moves inboard and, as best seen in FIG. 4, engages the bar 64 of latch lever 58 to move the latch lever 58 against the bias of leaf spring 66 and thereby pivot latch lever 58 out of the notch 54 of link 40. The seat occupant may then move the vehicle seat 10 forwardly from its full rearwardly adjusted position of FIG. 1. It will be apparent that such forward adjusting movement will move the pivot pin 36 forwardly and thereby cause link 50 to be rotated counterclockwise about the pivot pin 36. Bar 56 and latch lever 58 do not rotate since the seat back 14 is not tilted forwardly. When the desired degree of forward adjusting movement of the seat has been attained, the operating handle 104 is released and the shaft 72 is returned to its normal rotational position by the spring 94. Leaf spring 66 simultaneously returns latch lever 58 into engagement with the link 40 and into the notch 54 aligned therewith. The seat is thereby latched in the desired adjusted position.

FIG. 2 shows the seat back assembly 14 tilted forwardly and the vehicle seat 10 moved forwardly. Referring again to FIG. 1, it will be apparent that when the seat back assembly 14 is pivoted forwardly, support arm 32, bar 56, and latch lever 58 are rotated about pivot pin 36. The engagement of the latch plate 58 in the notch 54 will cause the link 40 to rotate in unison with the support arm 32 about the pivot pin 36. Since the other end of link 40 is connected to the stationary bracket 50 by link 44, it will be apparent that the pivot pin 36 and thus the entire vehicle seat 10 will be moved forwardly by such forward tilting movement of the seat back assembly 14 relative the seat cushion assembly 12. Thus it will be seen that the access opening to the rear seat is increased not only by the forward tilting of the seat back but by the bodily shifting forward movement of the entire vehicle seat 10 on the track assembly 20.

When the seat back assembly 14 is returned from the easy-enter position of FIG. 2 to the normal position of FIG. 1 it will be apparent that the entire vehicle seat 10 is again moved rearwardly.

When the seat 10 is in its fully rearwardly adjusted position as shown in FIG. 1, the forward tilting of the seat back for easy-enter results in nearly maximum forward bodily shifting movement of the vehicle seat 10 on the track assembly 20. This maximum easy-enter displacement takes place when the geometry of the various elements is such that a line drawn perpendicular to the track assembly from the shoulder bolt 46 bisects a line between the position of pivot pin 36 corresponding to the seat back being in a normal position of FIG. 1 and the easy-enter position of FIG. 2. Each increment of forward adjusting movement of the seat 10 by engagement of the latch lever 58 in the next forward notch 54 in link 40 displaces the pivot pin 36 forwardly with respect to the shoulder bolt 46 providing the lower pivot for the link 40. Thus each increment of forward adjustment of the seat 10 reduces the forward displacement of the vehicle seat 10 which will result when the seat back is tilted forwardly. Thus when the seat is adjusted to its full forward position little or no additional forward movement of the seat 10 will result from tilting the seat back assembly 14 forwardly.

Thus it is seen that an improved easy-enter vehicle seat construction is provided.

What is claimed is:

1. In combination with a vehicle, a vehicle seat comprising; a seat cushion assembly, means mounting the cushion assembly on the vehicle and permitting fore and aft adjustment of the vehicle seat, a seat back assembly, pivot means mounting the seat back assembly on the seat cushion assembly to permit movement of the seat back assembly between a seating position and a forwardly tilted easy-enter position, first and second links pivotally connected together at one end, means pivotally connecting the other end of the first link to the pivot means, means pivotally connecting the other end of the second link to the vehicle, the second link rotating the first link about the pivot means when the vehicle seat is adjusted fore and aft, and latch means acting between the first link and the seat back assembly to rotate the first link about the pivot means and move the vehicle seat forwardly when the seat back assembly is moved forwardly to easy-enter position, the latch means being unlatchable to permit rotary movement of the first link relative the seat back to permit fore and aft adjustment of the vehicle seat while the seat back assembly remains in seating position.

2. In combination with a vehicle, a vehicle seat comprising; a seat cushion assembly, means slidably mounting the seat cushion assembly on the vehicle floor to permit fore and aft adjusting movement of the vehicle seat, a seat back assembly having inboard and outboard support arms, pivot means pivotally mounting the support arms to the seat cushion assembly to permit movement of the seat back assembly between the seating position and a forwardly tilted easy-enter position first and second links pivotally connected together at one end, means pivotally connecting the other end of the first link to the pivot means, means pivotally connecting the other end of the second link to the vehicle, the second link rotating the first link about the pivot means when the vehicle seat is adjusted fore and aft on the mounting means, a notched sector on the first link and being arcuate about the pivot means, an extension on the support arm disposed adjacent the sector of the first link, a latch member movably mounted on the extension of the support arm and being engaged in one of the notches of the sector to latch the support arm to the first link whereby when the seat back is moved forwardly to easy-enter position the first link is rotated and the vehicle seat is moved forwardly on the mounting means.

3. In combination with a vehicle, a vehicle seat comprising; a seat cushion assembly, means slidably mounting the seat cushion assembly on the vehicle floor to permit fore and aft adjusting movement of the vehicle seat, a seat back assembly including inboard and outboard support arms, inboard and outboard pivot means pivotally mounting the support arms to the seat cushion assembly to permit movement of the seat back assembly between the seating position and a forwardly tilted easy-enter position, first and second links pivotally connected together at one end, means pivotally connecting the other end of the first link to one of the pivot means, means pivotally connecting the other end of the second link to the vehicle to rotate the first link about the one of the pivot means when the vehicle seat is adjusted fore and aft on the mounting means, a notched sector on the first link arcuate about the one of pivot means, an extension on the one of the support arms mounted by the one of the pivot means and disposed adjacent to the sector of the first link, a latch member pivoted to the extension of the one support arm, spring means biasing the latch member into one of the notches of the sector to latch the one support arm to the first link to rotate the first link and move the vehicle seat moved forwardly on the mounting means when the seat back assembly is moved forwardly to easy-enter position, and an operating handle means operable by the seat occupant to pivot the latch member against the bias of the spring out of the notch of the sector to permit fore and aft adjusting movement of the vehicle seat on the mounting means while the seat back remains in the seating position.

* * * * *